United States Patent [19]

Ito

[11] Patent Number: 4,527,020
[45] Date of Patent: Jul. 2, 1985

[54] ECHO CANCELLER FOR A LONG-DISTANCE TELEPHONE NETWORK

[75] Inventor: Yoshinori Ito, Tokyo, Japan

[73] Assignee: Nippon Electric Co., Ltd., Tokyo, Japan

[21] Appl. No.: 304,497

[22] Filed: Sep. 22, 1981

[30] Foreign Application Priority Data

Sep. 26, 1980 [JP] Japan .............................. 55-134009

[51] Int. Cl.³ .............................................. H04B 3/20
[52] U.S. Cl. .................................. 179/170.2; 364/723
[58] Field of Search ............... 179/170.2, 170.6, 170.8; 370/28, 32, 103, 29; 364/723; 375/118, 119

[56] References Cited

U.S. PATENT DOCUMENTS

| 4,020,332 | 4/1977 | Crochiere et al. | 364/723 |
| 4,064,379 | 12/1977 | Horna | 179/170.2 |
| 4,205,575 | 6/1980 | Hoskinson et al. | 364/723 |
| 4,270,026 | 5/1981 | Shenoi et al. | 364/723 |
| 4,334,128 | 6/1982 | Snijders | 179/170.2 |
| 4,363,938 | 12/1982 | Daaboul et al. | 179/170.2 |
| 4,379,347 | 4/1983 | Giradi et al. | 179/84 VF |
| 4,411,006 | 10/1983 | Horna | 179/170.6 |

OTHER PUBLICATIONS

R. Schafer, L. Rabiner; "A Digital Signal Processing Approach to Interpolation"; Proceedings of the IEEE; vol. 61, No. 6; Jun. 1973; pp. 692–702.

Primary Examiner—Gene Z. Rubinson
Assistant Examiner—Randall P. Myers
Attorney, Agent, or Firm—Howard L. Bernstein

[57] ABSTRACT

An echo canceller for use in a long-distance telephone network having a four-wire circuit and a two-wire circuit in which echoes are inherently produced at the junction of the four-wire circuit and the two-wire circuit. A sample interpolator converts the incoming digital signal into a digital signal having the same sampling rate as that of the outgoing digital signal on the basis of relative positions of sampling time for corresponding imaginary envelopes of the incoming and outgoing digital signals. An echo estimator produces an estimated echo signal responsive to the output of the sample interpolator for cancelling the echo signal. The estimated echo signal is substracted from the unprocessed digital signal to produce an echo-cancelled digital signal.

15 Claims, 65 Drawing Figures

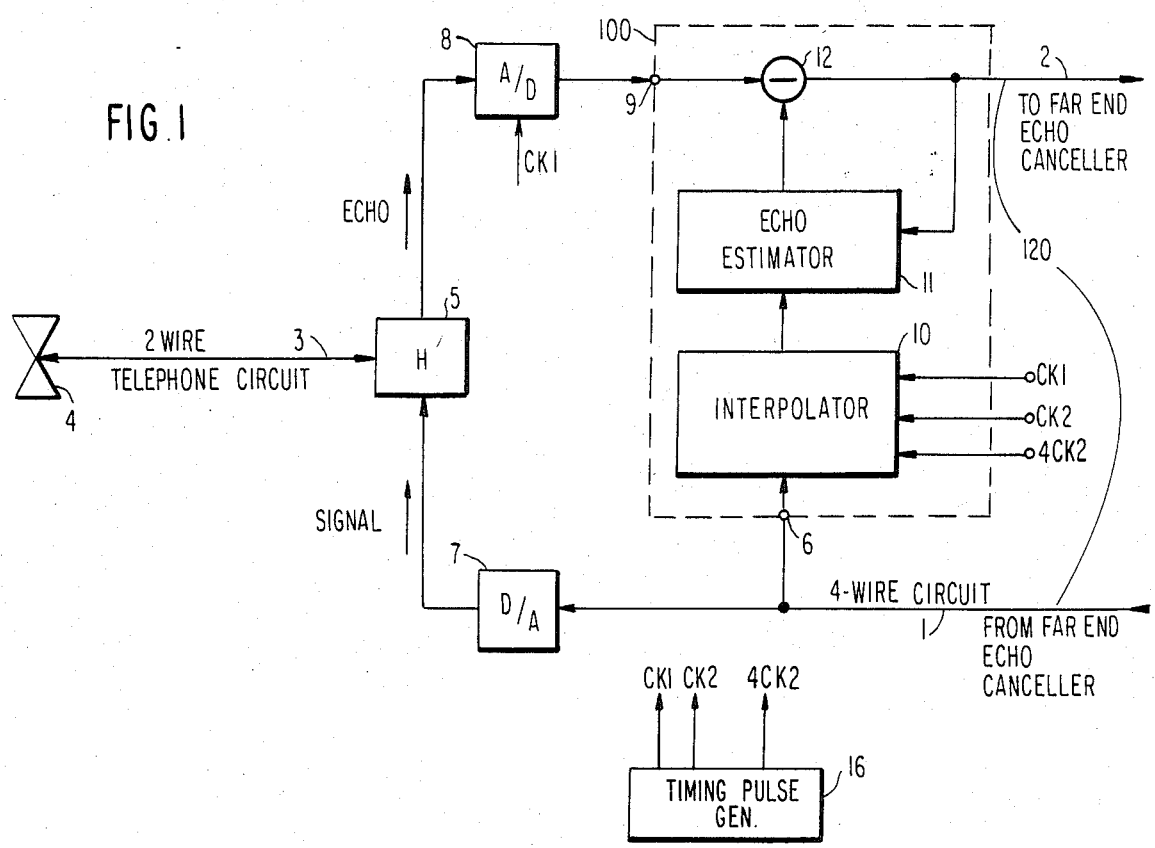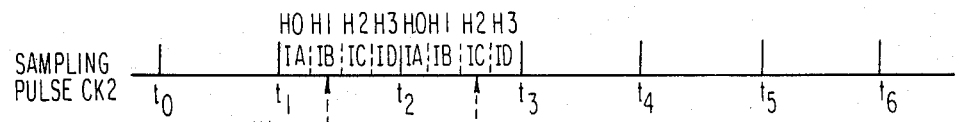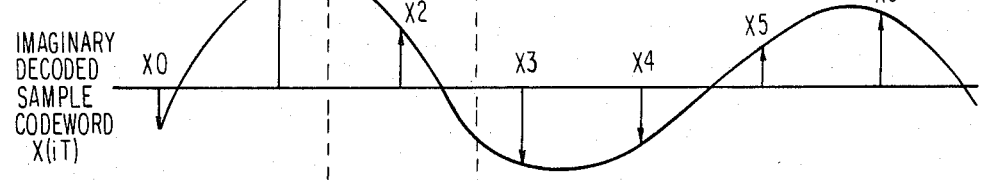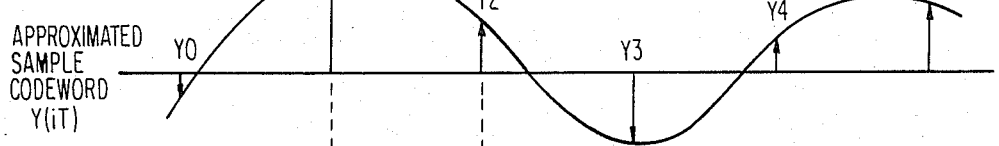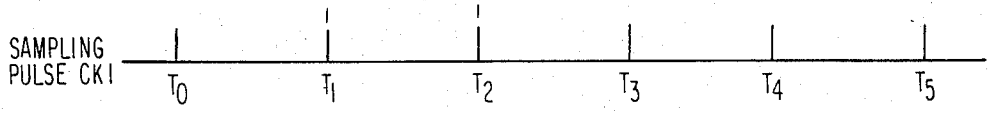

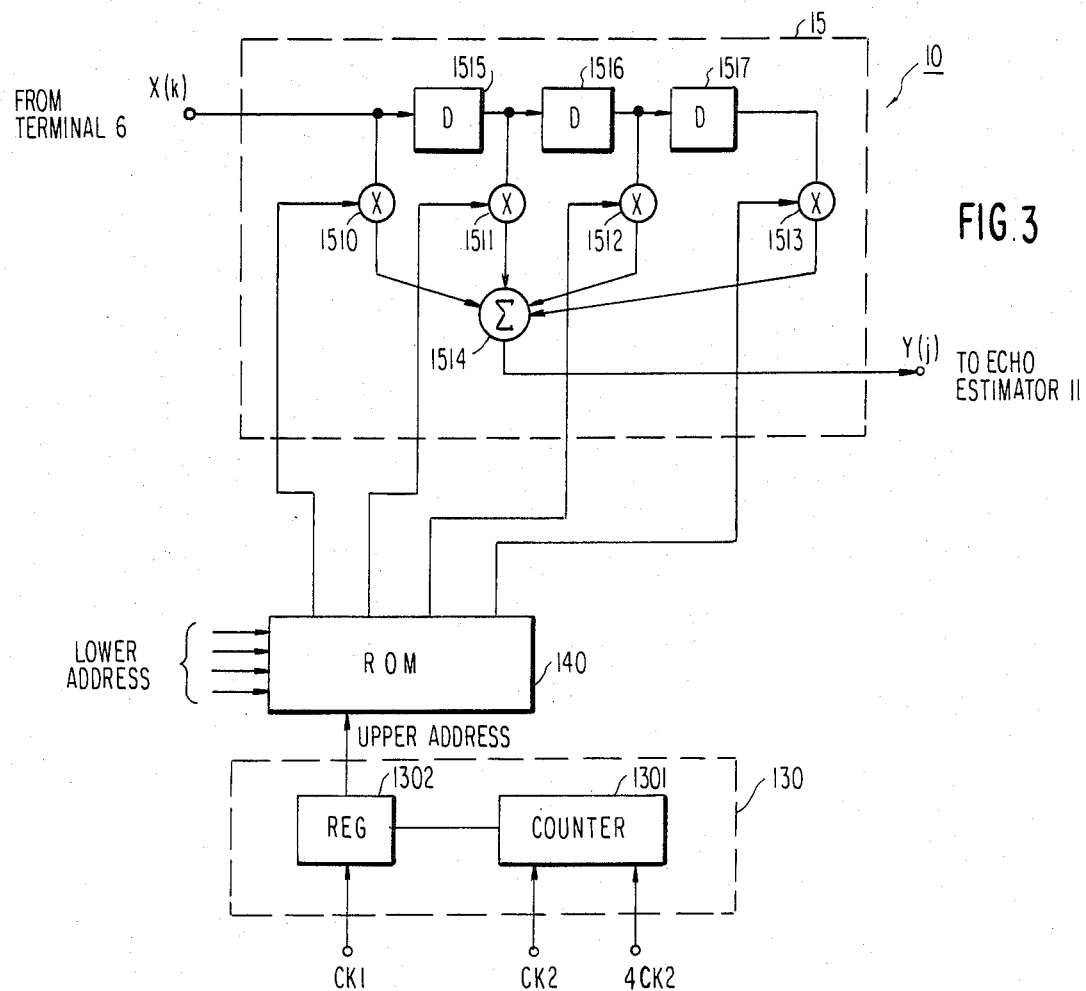

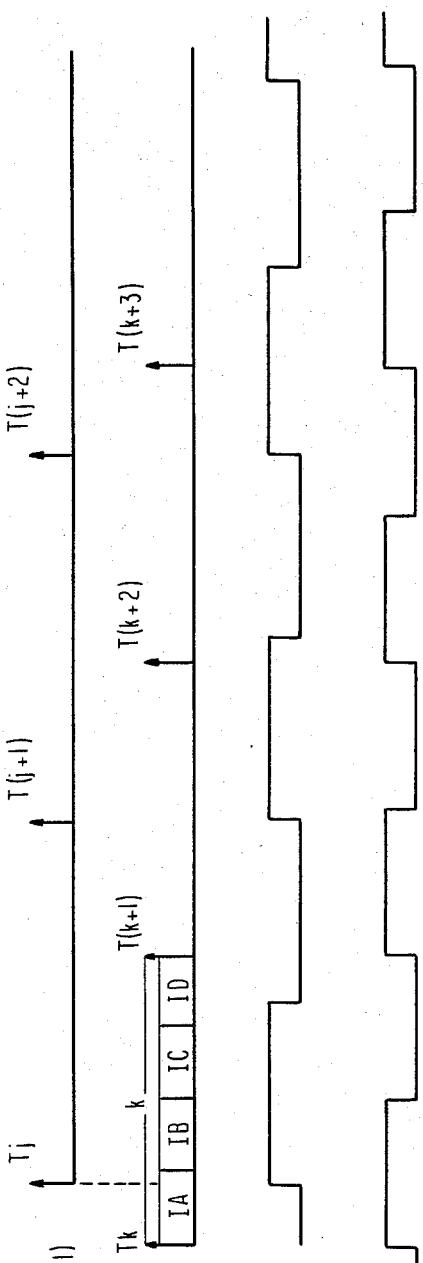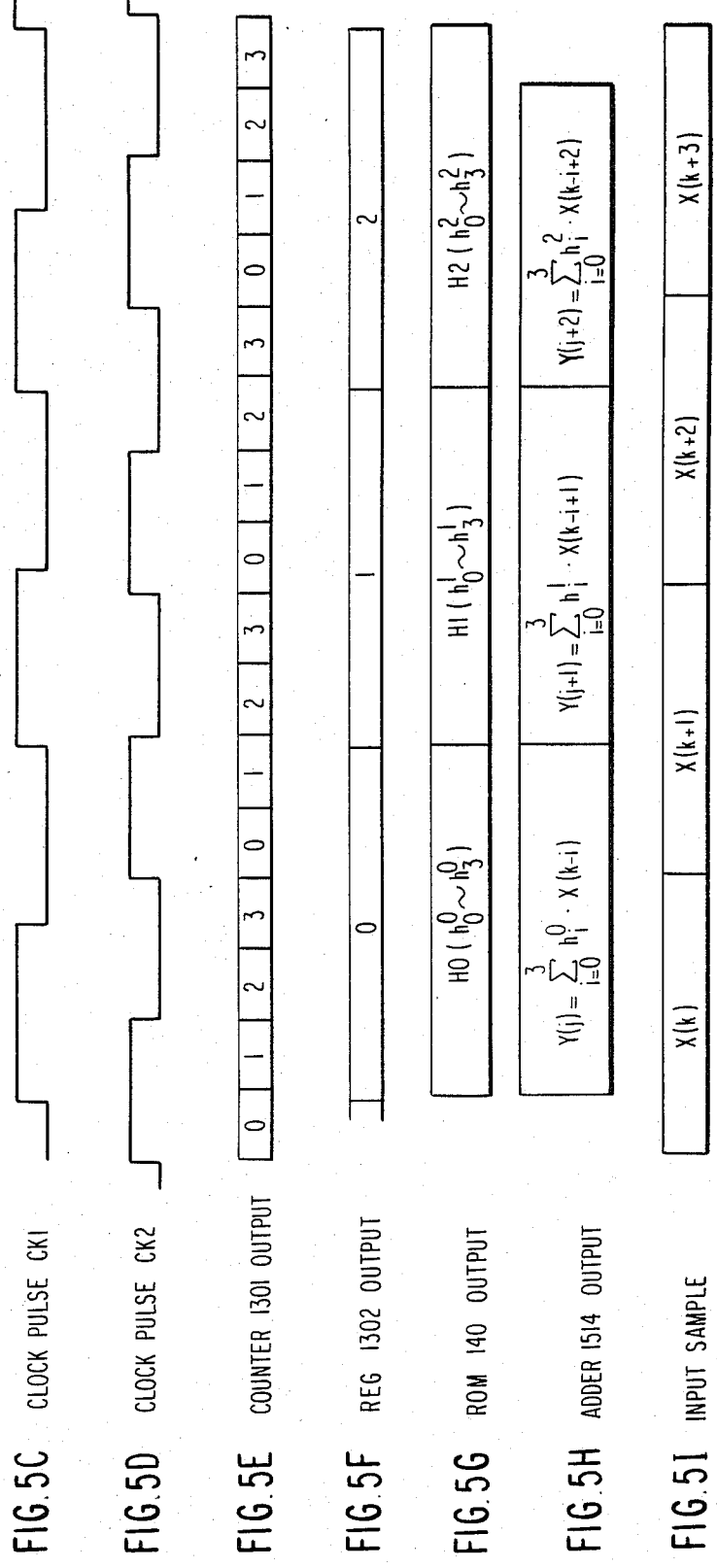

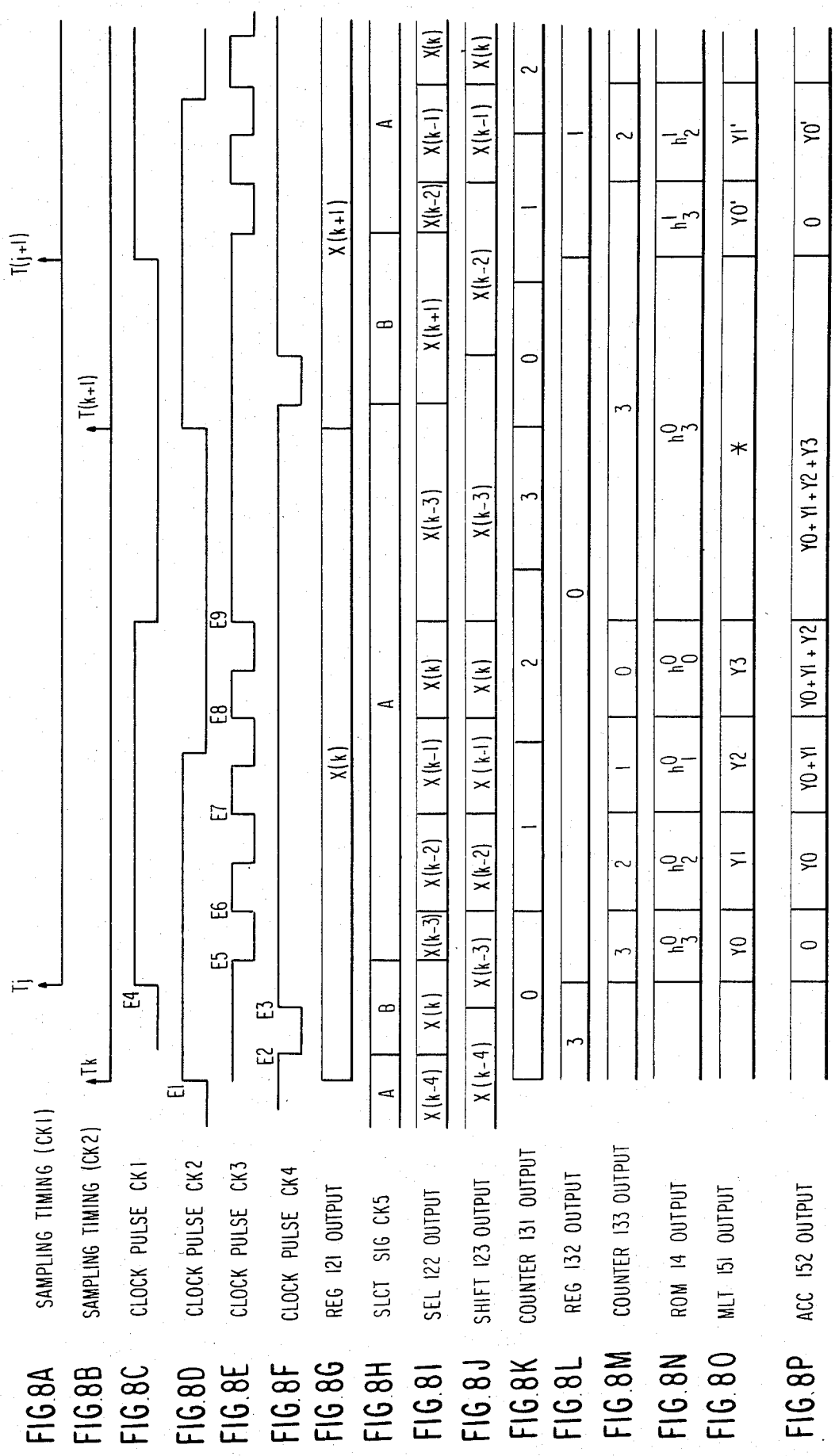

| | | |
|---|---|---|
| FIG.9A | SAMPLING TIMING | $T_j$ |
| FIG.9B | SAMPLING TIMING | $T_k$, $T_{(k+1)}$, $T_{(j+1)}$ |
| FIG.9C | CLOCK PULSE CK1 | |
| FIG.9D | CLOCK PULSE CK2 | |
| FIG.9E | CLOCK PULSE CK3 | |
| FIG.9F | CLOCK PULSE CK4 | |
| FIG.9G | REG 121 OUTPUT | $X(k)$ \| $X(k+1)$ |
| FIG.9H | SLCT SIG CK5 | A \| B \| B |
| FIG.9I | SEL 122 OUTPUT | $X(k-4)$ \| $X(k-3)$ \| $X(k-2)$ \| $X(k-1)$ \| $X(k-2)$ \| $X(k)$ \| $X(k+1)$ \| $X(k-1)$ |
| FIG.9J | SHIFT 123 OUTPUT | $X(k-4)$ \| $X(k-3)$ \| $X(k-2)$ \| $X(k-1)$ \| $X(k-4)$ \| $X(k-3)$ \| $X(k)$ \| $X(k-1)$ |
| FIG.9K | COUNTER 131 OUTPUT | 0 \| 1 \| 2 \| 3 \| 0 \| 1 |
| FIG.9L | REG 132 OUTPUT | 3 |
| FIG.9M | COUNTER 133 OUTPUT | 3 \| 2 \| 1 \| 0 \| 3 \| 2 |
| FIG.9N | ROM 14 OUTPUT | $h_3^3$ \| $h_2^3$ \| $h_1^3$ \| $h_0^3$ \| $h_3^3$ \| $h_2^0$ |
| FIG.9O | MLT 151 OUTPUT | $Z_0$ \| $Z_1$ \| $Z_2$ \| $Z_3$ \| * \| * \| * \| $Z_0'$ |
| FIG.9P | ACC 152 OUTPUT | 0 \| $Z_0$ \| $Z_0+Z_1$ \| $Z_0+Z_1+Z_2$ \| $Z_0+Z_1+Z_2+Z_3$ \| 0 \| $Z_0'$ |

ECHO CANCELLER FOR A LONG-DISTANCE TELEPHONE NETWORK

BACKGROUND OF THE INVENTION

The present invention relates to an echo canceller for eliminating undesirable echoes occuring in a long-distance telephone network and, more particularly, to an echo canceller suited for a long-distance digitized telephone network where the incoming and outgoing digital signals have different sampling rates.

It is well known that a hybrid circuit connecting a two-wire circuit to a long-distance four-wire circuit in such a telephone network cannot provide echo-free coupling between the transmission and reception paths of the four-wire circuit. The reason for this is that a part of the incoming signal supplied to the reception path of the four-wire circuit leaks to the transmission-side path through the hybrid circuit, causing so-called "talker's" echo at the other end of the long-distance four-wire circuit.

An example of such an echo canceller is shown in the U.S. Pat. No. 4,064,379. The echo canceller disclosed therein is based on total digitization of the signal to be processed, wherein a replica of the echo signal used for cancellation of the true echo.

Generally, in such a long-distance telephone network, the master clock sources disposed at both ends of the four-wire circuit are subject to frequency fluctuation, with the result that the sampling times of the sampling pulses produced by counting-down master clock pulses differ from one another. For this reason, the prior art echo canceller, which suffers from this frequency fluctuation problem, cannot achieve accurate echo cancellation between the talker's echo and an estimated echo.

An object of the present invention is, therefore, to provide an echo canceller free from the disadvantages in the prior art.

SUMMARY OF THE INVENTION

According to one aspect of this invention, there is provided an echo canceller for use in a long-distance telephone network having a four-wire circuit and a two-wire circuit and which is responsive to an incoming digital signal supplied from the reception-side path of four-wire circuit and to an unprocessed digital signal including a digital echo signal supplied to the input of the transmission-side path with an outgoing digital signal substantially free from digital echo signal, the digital echo signal being produced at the junction of the four-wire circuit and the two-wire circuit and with the incoming and outgoing digital signals having different sampling rates.

The echo canceller of the present invention includes: a sample interpolator for converting the incoming digital signal into a digital signal having the same sampling rate as that of the outgoing digital signal on the basis of relative positions of the sampling times for corresponding imaginary envelopes of the incoming and outgoing digital signals; an echo estimator responsive to the output of the sample interpolator for producing an estimated echo signal used to cancel the echo signal; and means for subtracting the estimated echo signal from the unprocessed digital signal to produce an echo free digital signal.

BRIEF DESCRIPTION OF THE DRAWINGS

The invention will be described in greater detail in conjunction with the accompanying drawings, wherein:

FIG. 1 is a block diagram of a first preferred embodiment of an echo canceller of the invention;

FIGS. 2A to 2D are diagrams used for describing a sample interpolation process;

FIG. 3 is a schematic diagram illustrating in detail a sample interpolator for use in the first preferred embodiment;

FIG. 4 is a table describing the operation of a part of the circuit illustrated in FIG. 3;

FIGS. 5A to 5I are waveform diagrams describing the operation of the circuit shown in FIG. 3;

FIGS. 8A to 8P and FIGS. 9A to 9P are waveform diagrams of waveforms describing the operation of the circuit shown in FIG. 6;

In the drawings, identical structural elements are depicted by identical numerals.

DESCRIPTION OF THE PREFERRED EMBODIMENTS

Figure 6:
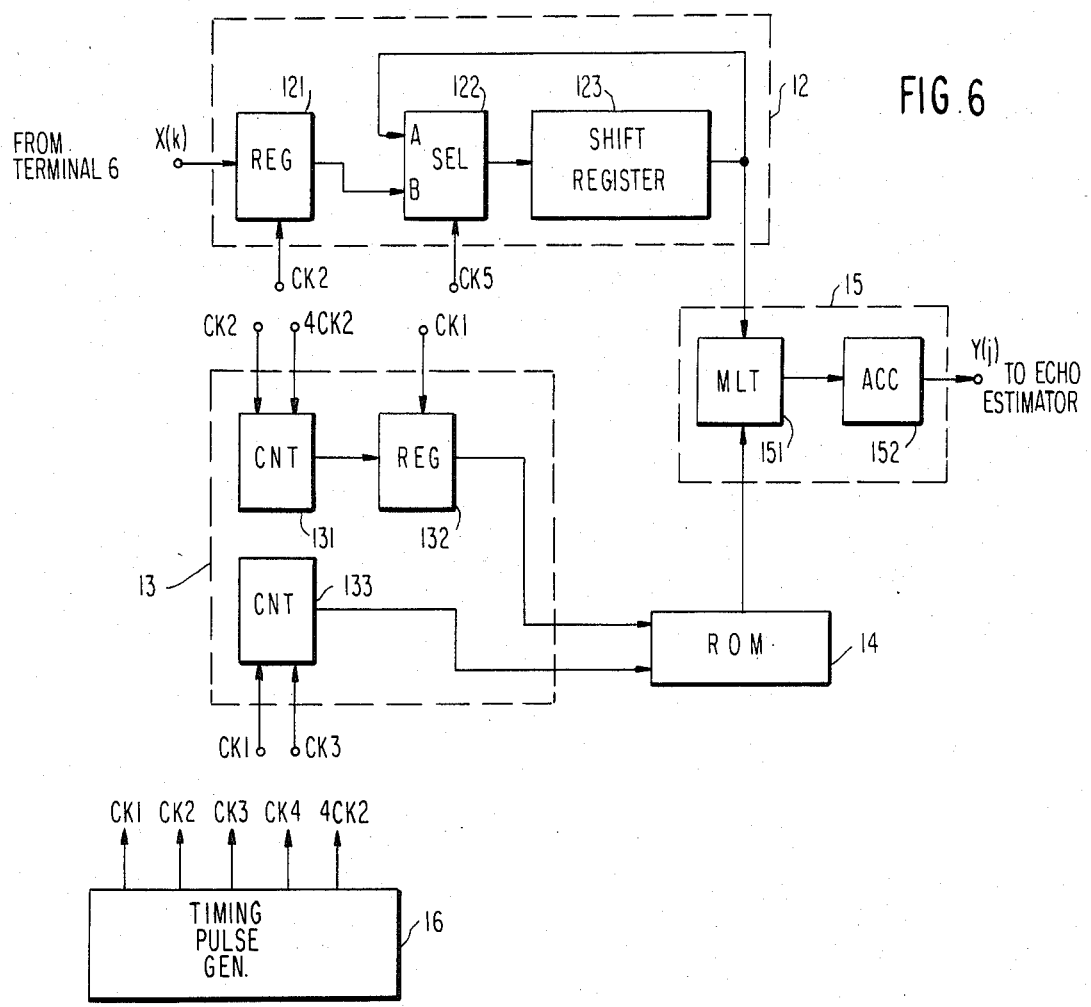
FIG. 6 is a schematic diagram of a modification of the circuit of FIG. 3.

Referring to FIG. 1, a long-distance telephone network to which the present invention is applicable has a local two-wire circuit 3 connected to a subscriber set 4, a long-distance four-wire circuit 120, which may include a submarine cable or a communication satellite link, and a hybrid circuit 5 for coupling the two-wire and four-wire circuits 3 and 120 to each other.

The signal reception side of the hybrid circuit 5 is connected to a digital-to-analog (D/A) converter 7 for decoding the incoming digitized telephone signal supplied through the circuit 120. Similarly, to the signal transmission side of the hybrid circuit 5 is connected an analog-to-digital (A/D) converter 8 for digitizing an analog speech signal supplied from the subscriber set 4.

The output of the A/D converter 8 is transmitted to the long-distance four-wire circuit 120 through an echo canceller 100 of the present invention to which the outgoing digital signal and the incoming digital signal are supplied through terminals 9 and 6, respectively. A timing pulse generator 16 is also provided for providing sampling pulse signals CK1 and CK2 to the A/D converter 8 and the echo canceller 11.

It should be noted that there is provided at the other end of the long-distance telephone network a combination of the 2-wire and four-wire circuits and the echo canceller identical to the one described above.

The echo canceller 100 has a sample interpolator 10 for converting the sampling rate of the incoming digital signal into another sampling rate preset for the signal digitization at the A/D converter 8 for transmission. For this purpose, the so-called interpolation process is employed. The output of the sample interpolator is supplied to an echo estimator 11 which produces an estimated echo signal, i.e., a replica of the incoming signal which cancels the talker's echo when transmitted back to the other end of the four-wire circuit 120. A subtractor 12 is also provided for subtracting the estimated echo signal from the outgoing digital signal. For details of the subtractor 12 and the echo estimator 11, reference is made to FIG. 1 of U.S. Pat. No. 4,064,379. Stated in more detail, the output of the A/D converter 113, the subtractor 114, the output of the A/D converter 105, and the output of the register 111 shown in FIG. 1 of the above-mentioned U.S. patent correspond to the terminal 9, the subtractor 12, the input of the estimator, and the output of the estimator 11 of the present invention, respectively.

It is to be noted that, in the present echo canceller, parallel-bit processing is done by the use of serial-to-parallel converters (not shown) provided at the input and output terminals of the canceller.

Referring to FIG. 2B, time-sequential code words, which constitute the incoming digital signal supplied to the echo canceller 100 and which represent the signal samples digitized at the other end of the four-wire circuit 120 in response to a sampling pulse signal CK2 (FIG. 2A), are shown as imaginary decoded samples X0, X1, X2, ... X6, ... with an imaginary envelope. As will be seen in FIGS. 2A and 2B, the samples X0, X1, X2, ..., X6 ... occur at times corresponding to the sampling times t0, t1, t2, ... t6 ... which are defined by a clock pulse source disposed at the other end of the long-distance four-wire circuit.

The telephone signal supplied from the subscriber set 4 for transmission from this end of the four-wire circuit 120 is digitized at the A/D converter 8 in response to another sampling pulse signal CK1 (FIG. 2D) composed of pulses occuring at times T0, T1, T2, ... T6, . ... The leaked portion of the incoming signal applied to the A/D converter 8 is also sampled by the sampling pulse signal CK1 together with the outgoing telephone signal. To cancel out the leaked portion of the incoming signal at the subtractor 12, the estimated echo signal must be in timed relationship with the outgoing digital signal. However, since the incoming digital signal having the sampling times t0, t1, t2, ..., t6 may well be out of synchronism with the outgoing digital signal, the estimated echo signal does not necessarily reflect a faithful simulation of the leaked portion of the incoming signal, making echo cancellation difficult.

To overcome this problem, the present invention relies on the so-called sample interpolation process in which the sample code words X0, X1, X2, ... and X6 ... are translated to approximated sample codewords Y0, Y1, Y2, ... Y6 ... timed with the sampling pulse signal CK1.

The simplest process to achieve such sample interpolation is to obtain the sample code words Y0 to Y5 at times T0 to T5 by the use of the sample code words X0 to X5. Briefly stated, with this signal processing, the sample code word Y1, for example, occurring between the times t1 and t2 is obtained using the sample code words X1 and X2. Similarly, the sample code word Y2 is obtained using the sample code words X2 and X3. Such sample interpolation can be achieved with a digital filter having a group of predetermined filter coefficients. For details of such a sample interpolation process and a device for performing such interpolation, reference is made to an article by Ronald W. Schafer et al. entitled "A Digital Signal Processing Approach to Interpolation," *Proceedings of the IEEE,* Vol. 61, No. 6, June 1973, pp. 692–702.

However, with the filter having only one group of filter coefficients as shown in the Schafer article, values to be interpolated are limited to prescribed positions between sampling times (for instance, intermediate points between adjacent sampling times). As a result, such a filter cannot achieve accurate sample interpolation.

In contrast, the sample interpolator used in the present invention, which can achieve more accurate sample interpolation, operater in the following manner;

(1) Each of the intervals of the sampling pulse signal CK2 is divided into N (a positive integer) segments, each of which corresponds to a group of filter coefficients;

(2) Each value to be interpolated at each occurrence of a pulse of the sampling pulse signal CK1 is obtained using such a coefficient group allotted to one of the N segments appearing at the time of one of the pulses of the sampling pulse signal CK1.

Stated in more detail, as illustrated in FIG. 2A, each pulse interval of the sampling pulse signal CK2 is divided into four segments IA, IB, IC and ID (N=4), and plural filter coefficient groups H0 to H3 are allotted to IA to ID, respectively. Since, at the sampling time T1, the segment IB appears, the coefficient group H1 is used to produce the sample codeword Y1 to be interpolated. Similarly, the coefficient group H2 is used to obtain the sample codeword Y2 to be interpolated at the sampling time T2.

Referring to FIG. 3, the sample interpolator 10 shown in FIG. 1 includes a transversal filter 15 having an input terminal for receiving the incoming digital signal from the terminal 6 and an output terminal connected to the estimator 11, a read-only memory (ROM) 140 for storing the four coefficient groups for the filter 15, and an address generator 130 for generating addresses for the ROM 140. The filter 15 consists of three delay elements 1515 to 1517, four multipliers 1510 to 1513, and an adder 1514 for summing the outputs of the multipliers 1510 to 1513. The generator 130 is made up of a counter 1301 and a register 1302. The counter 1301 cleared by the sampling pulse signal CK2, performs a counting-up operation in response to a timing pulse signal 4 CK2 having a repetition rate four times that of the sampling pulse signal CK2. The register 1302 stores the output of the counter 1301 in response to the sampling pulse signal CK1 which is applied as an upper address (higher order address bits) to the ROM 140. Lower addresses (lower order address bits) "00", "01", and "10" "11" (corresponding to 0, 1, 2, and 3 in decimal notation) are continuously sequentially applied to the ROM 140.

The operation of the interpolator of FIG. 3 will be described below in detail referring to FIGS. 1, 4, and 5.

In the following description, the address values "0", "1", "2", "3", etc. specified decimal notations are of course supplied in binary format in the actual circuitry.

FIG. 4 shows typical filter coefficient groups. In the table of FIG. 4, a specific one of coefficient groups H0 to H3 is designated by a corresponding one of upper addresses "0" to "3", while specific coefficients within of the coefficient group designated are chosen in accordance with the lower address "0" to "3".

FIG. 5 is a waveform diagram showing the timing relationship between the sampling times in synchronism with the sampling pulse signals CK1 and CK2 and the outputs of the main structural elements of FIG. 3.

As shown in FIG. 5, the sampling times Tj (FIG. 5A), which is in synchronism with the outgoing digital signal and which is aligned in time with the sampling pulse signal CK1 (FIG. 5C), falls in the segment 1A of a sampling interval k (FIG. 5B), which occurs in synchronism with the incoming digital signal and with the sampling pulse signal CK2 (FIG. 5D). Under this state, since the register 1302 shown in FIG. 3 then stores the output "0" (FIG. 5F) from the counter 1301 in response to the sampling pulse signal CK1, an upper address "0" is applied to the ROM 140 corresponding to the coefficient group H0 (FIG. 4). At this time, as the lower addresses "0" to "3" are applied to the ROM 140, the ROM 140 supplies the coefficients $h_0^0$ to $h_0^3$ (FIG. 5G) to the multipliers 1510 to 1513.

Further, a sample code word X(k) (FIG. 5I) fed to the terminal 6 at the time Tk (FIG. 5B) is applied to the multiplier 1510. Similarly, sample code words X(k−1), X(k−2), and X(k−3), which were supplied to the terminal 6 at sampling times T(k−1), T(k−2), and T(k−3) preceding the time Tk, are applied to the multipliers 1511 to 1513 through the delay elements 1515 to 1517, respectively. The coefficients $h_0^0$ to $h_3^0$ are multiplied by the sample code words X(k) to X(k−3) in the multipliers 1510 to 1513, respectively, with the results summed by the adder 1514 (See FIG. 3) to thus provide the sample code word Y(j) (FIG. 5H) to be interpolated.

Referring to FIG. 6, another example of the interpolator 10 shown in FIG. 1 is composed of a digital filter 15 having a multiplier 151 and an accumulator 152, a coefficient circuit 14 implemented with of a read-only memory (ROM) for storing the coefficients for the filter 15, a circuit 12 for supplying sample code words to the digital filter 15, an address generator 13 for producing addresses for the coefficient circuit 14, and a timing pulse generator 16 for generating pulses used to control the circuits 12, 13, and 15. The circuit 12 further includes a register 121 for storing input sample code words in response to pulses of the sampling pulse signal CK2, a selector 122 receiving the output of the register 121 at an input terminal B and the output of a shift register 123 at an input terminal A selecting either the output of the register 121 or the shift register 123 as the input to the shift register 123 in response to a timing pulse signal CK5, and the four-stage shift register 123 for sequentially shifting the output of the selector 122 in response to timing pulse signals CK3 and CK4. The address generator 13 includes counters 131 and 133 and a register 132. The counter 131 and the register 132 perform the same operations as those of the counter 1301 and register 1302 shown in FIG. 3, respectively. After a predetermined value is set in the counter 133 by the sampling pulse signal CK1, the counter 133 counts down starting from the predetermined value in response to the timing pulse signal CK3.

Figure 7:
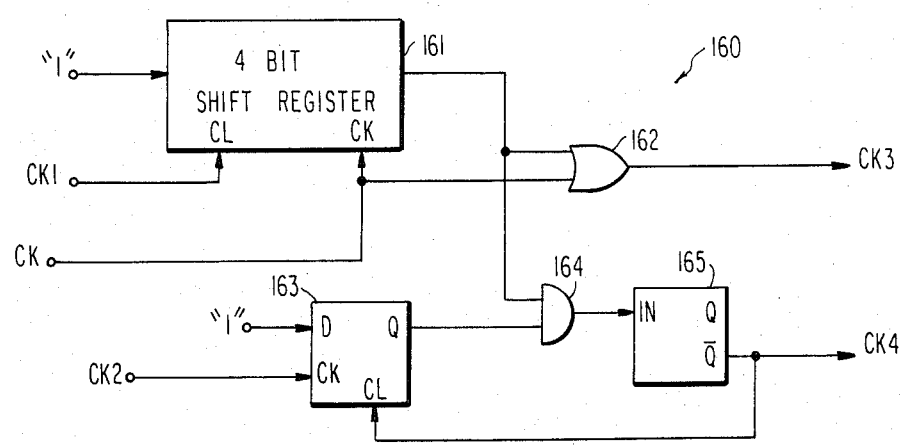
FIG. 7 is a schematic diagram showing a part of the circuit shown in FIG. 6.

Referring to FIG. 7, a part 160 of the timing pulse generator 16 which generates the timing pulse signals CK3 and CK4 is composed of a four-stage shift register 161, an OR gate 162, a D-type flip-flop 163, an AND gate 164, and a monostable multivibrator 165. The shift register 161 has a clear terminal CL receiving the sampling pulse signal CK1, by which the shift register's contents are cleared on the leading edge of each CK1 pulse, and an input terminal receiving a logic "1". The OR gate 162 produces a logical sum of the output of the register 161 and an input sampling pulse signal CK. A logic "1" is set in the F/F 163 with the sampling pulse signal CK2. The AND gate 164 produces a logical product of the output of the flip-flop 163 and that of the register 161. The multivibrator 165 inverts the output of the gate 164.

FIGS. 8A to 8P are waveform diagrams which will be used for describing the operation of the sample interpolator shown in FIG. 6. This operation will be described in detail hereunder referring to FIGS. 6 to 8 under the state where the temporal relationship between the sampling times Tj (FIG. 8A) and Tk (FIG. 8B) is the same as that shown in FIG. 5.

The sample code word X(k) (FIG. 8G) fed to the terminal 6 is stored in the register 121 at the leading edge E1 of a pulse of the sampling pulse signal CK2 (FIG. 8D). At this time, in the register 123 are stored sample code words X(k−4), X(k−3), X(k−2), and X(k−1), which were respectively applied to the terminal 6 at sampling times T(k−4), T(k−3), T(k−2), and T(k−1) preceding the time Tk. At the edge E1, an initial value "0" (FIG. 8K) is set in the counter 131. The selector 122 is then switched at the trailing edge E2 (FIG. 8F) to supply the output X(k) of the register 121 to the register 123. However, the output (FIG. 8J) of the register 123, to which neither the timing pulse CK3 (FIG. 8E) nor the timing pulse CK4 (FIG. 8F) is supplied, retains the code word X(k−4). At the leading edge E3, the register 123 stores the output X(k) of the register 121 and at the same time applies the sample codeword X(k−3) to the multiplier 151.

Next, at the leading edge E4 of a pulse the sampling pulse signal CK1 (FIG. 8C), "3" (FIG. 8L) is set in the counter 133 as the initial count value. Further, at this edge E4, the register 132 stores the output "0" of the counter 131 while the accumulator 152 is restored to its initial state (FIG. 8P). The output "0" (FIG. 8L) of the register 132 and the output "3" (FIG. 8M) of the counter 133 are applied to the coefficient circuit 14 as an upper address and a lower address, respectively. Upon reception of the upper and lower addresses, the coefficient circuit 14 out-puts the coefficient $h_3^0$ (FIG. 8N) (see the table shown in FIG. 4) which is sent to the multiplier 151. The sample code word X(k−3) multiplied by the coefficient $h_3^0$ by the multiplier 151 is applied to the accumulator 152 as the product Y0 (FIG. 8O).

At the pulse of the trailing edge E5 of the timing pulse signal CK3, the selector 122 selects the terminal A in response to a selection signal CK5 pulse (FIG. 8H) from the circuit 16. Since the counter 133 applies a lower address "2" to the coefficient circuit 14 at the leading edge E6 of the timing pulse signal CK3, the coefficient circuit 14 outputs the coefficient $h_2^0$ to the multiplier 151. Further, at this leading edge E6, the register 123 applies the sample code word X(k−2) to the multiplier 151, and the sample codeword X(k−2) multiplied by the coefficient $h_2^0$ is supplied from the multiplier 151 to the accumulator 152 as the product Y1. The accumulator 152 accumulates the products Y0 and Y1 obtained at the leading edge E5. The same procedure as at the leading edge E6 is performed for the sample code words X(k−1) and X(k) at the leading edges E7 and E8. At the leading edge E9 of the timing pulse signal CK3, the accumulator 152 calculates the total sum of the products obtained at the leading edges E4 and E6-E8 to compute the interpolation sample code word Y(j). The sample code word to be interpolated at the sampling time Tj is obtained in this manner.

Referring to FIG. 9, each waveform is produced in timing relationship to coincidence of the sampling time Tj (FIG. 9A) with the sampling time tk (FIG. 9B). Referring back to FIG. 8, since the multiplication by the filter 15 is started after the leading edge of the timing pulse CK1 (FIG. 8C), no input sample code word after the leading edge of the sampling pulse signal CK2 (FIG. 8D) can be stored in the shift register 123. Therefore, the storing of the input sample code word in the register 123 takes place after the completion of the multiplication by the filter 15. Since the other operations are the same as those illustrated in FIG. 8, further thereof description will be omitted.

Figure 10:
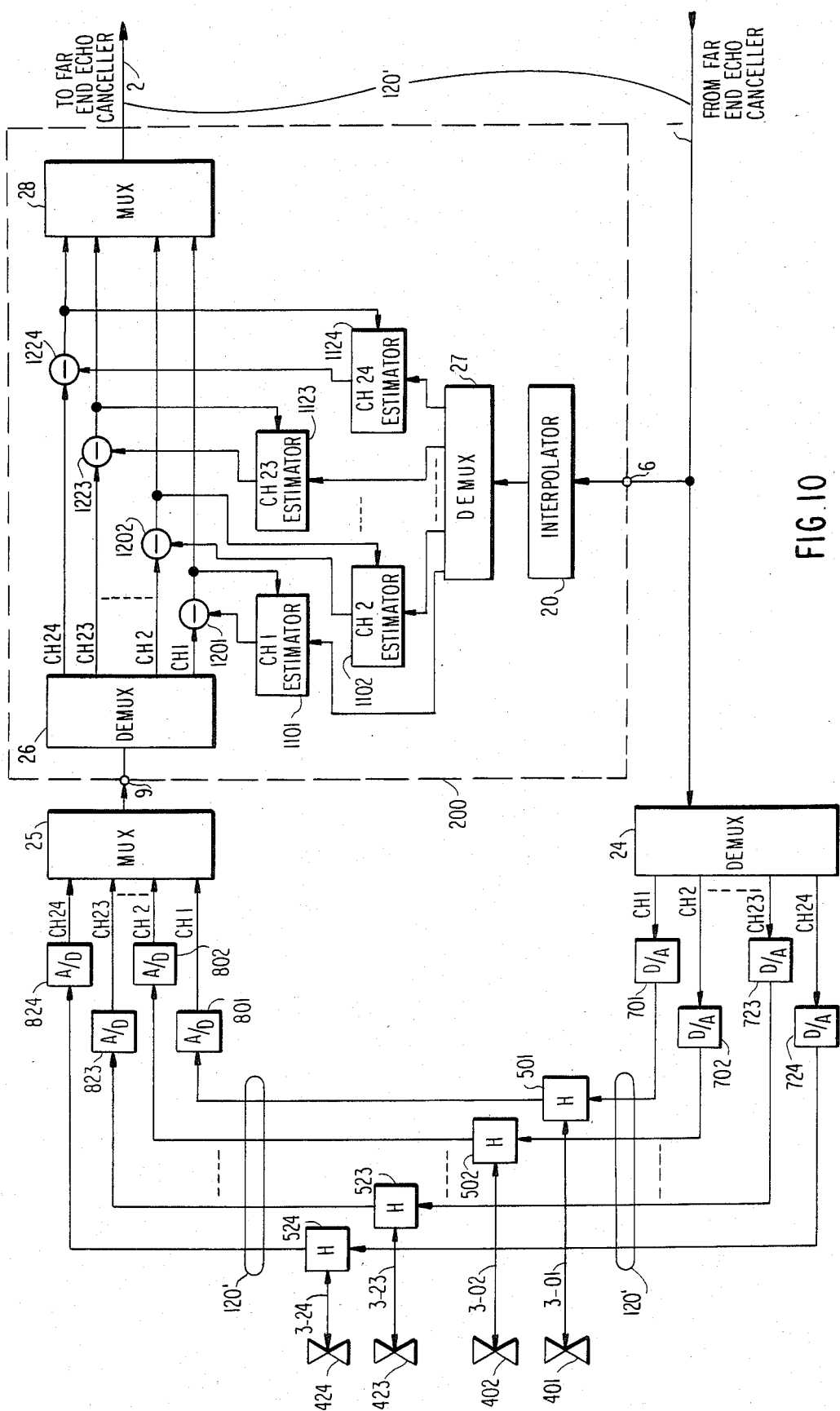
FIG. 10 is a block diagram of a second preferred embodiment of an echo canceller of the invention.

Referring to FIG. 10, another long-distance telephone network to which the present invention is applicable has local two-wire circuits 3-01 to 3-24 connected to subscriber sets 401–424, a four-wire circuit 120' composed of 24-channel communication lines and hybrid circuits 501 to 524 for coupling the two-wire and four-wire circuits to each other, and a multiplexer 25 and a demultiplexer 24 for performing the multiplexing and demultiplexing to and from the communication lines 120'.

To the reception sides of the circuits 501 to 524 are connected D/A converters 701 to 724 and to the transmission sides of the circuits 501 to 524 are connected A/D converters 801 to 824. The outputs of the A/D converters 801 to 824 are applied to the circuit 120' through an echo canceller 200 of invention designed for the 24-channel time division multiplex communication. Needless to say, there is provided at the other end of the long-distance telephone network, a combination of the circuits 3-01 to 3-24 and 120' and the echo canceller identical to the one mentioned above.

Referring to FIG. 10, the 24-channel multiplexed digital signal, having a repetition 24 times that of the timing pulse signal CK2 is supplied through the digital reception side path 1 to both the reception terminal 6 of an echo canceller 200 and a demultiplexer 24. The demultiplexer 24 separates multiplexed digital signal into the incoming digital signals corresponding to each of the 24 channels. The demultiplexed signals are converted into original telephone signals by D/A converters 701 to 724 provided for each of the 24 channels and supplied through hybrid circuits 501 to 524 to subscriber sets 401 to 424. All the circuits 501 to 524 produce echoes which are received at the inputs of the A/D converters 801 to 824. The digitized echoes converted by the converters 801 to 824 are multiplexed by a multiplexer 25 and fed to a demultiplexer 26 through a transmission terminal 9 of the canceller 200. The multiplexed digital echo signal is separated by demultiplexer 26 into the digital echo signals corresponding to each of 24 channels.

Meanwhile, the 24-channel multiplexed digital signal applied to the terminal 6 is converted into a digital signal with the sampling pulse signal 24CK1 by an interpolator 20 to be described hereunder. The output of the interpolator 20 is separated by a demultiplexer 27 into outputs corresponding to 24 channels, with the separated signals supplied to echo estimators 1101 to 1124. The echo estimators 1101 to 1124, in response to the outputs fed by the demultiplexer 27, produce estimated echoes to be sent to subtractors 1201 to 1224. Each of the subtractors 1201 to 1224 performs subtraction between a corresponding digital echo signal from the demultiplexer 26 and each of the estimated echo. The outputs of the subtractors 1201 to 1224 (residual echoes) are again supplied to the estimators 1101 to 1124 to bring the estimated echoes closer to the true echoes.

Figure 11:
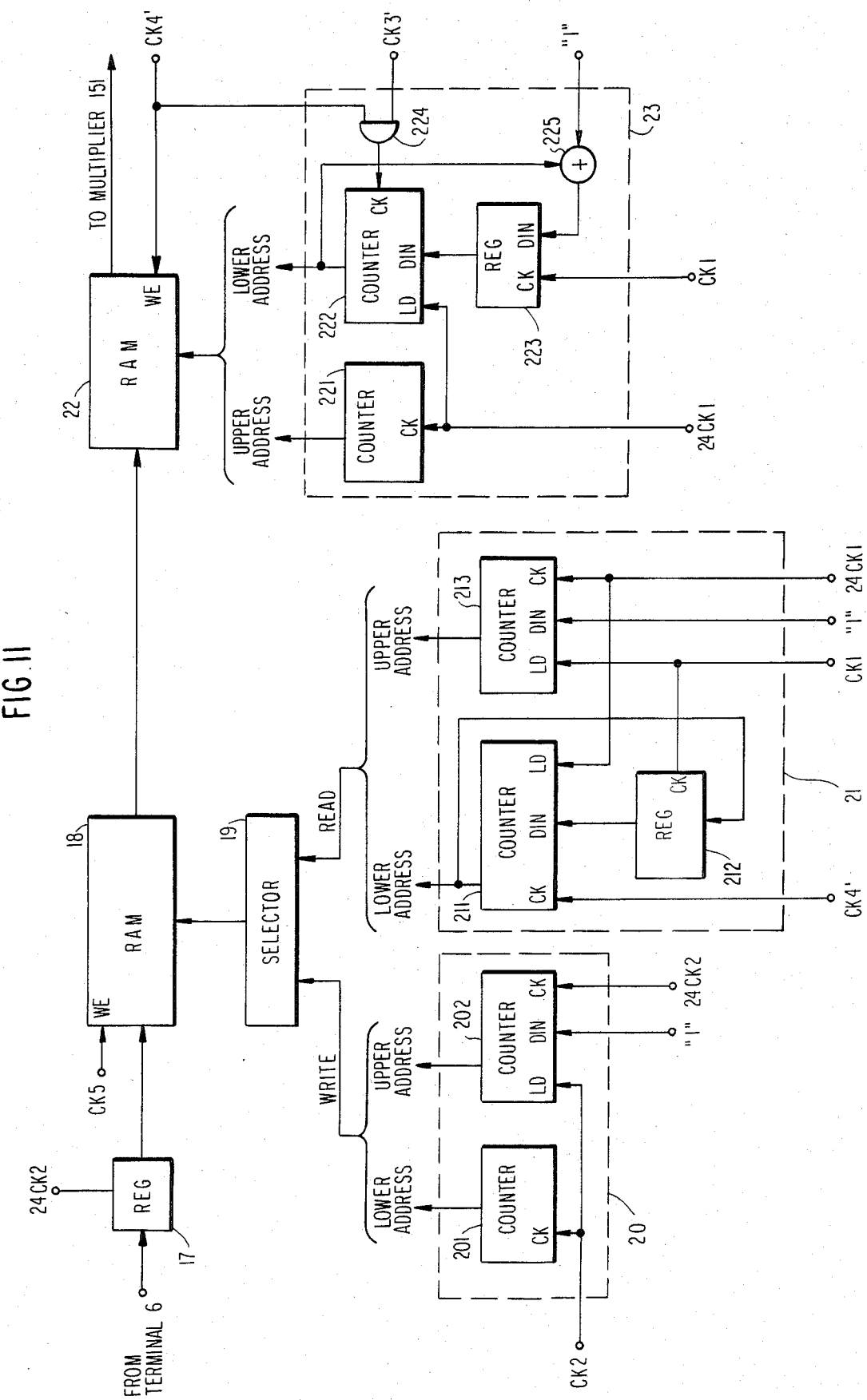
FIG. 11 is a detailed diagram of a part of the second embodiment.

FIG. 11 shows a part of the interpolator 20 shown in FIG. 10.

Referring to FIG. 11, the structure in the 24-channel arrangement corresponding to the register 121 and the selector 122 in the single channel arrangement 17, a random access memory (RAM) 18, a read address generator 21, a write address generator 20, and a selector 19 for switching between these circuits 20 and 21. The RAM 18 has 24 storage areas, each corresponding to one of the channels, in which are stored three sample code words $X(k-1)$, $X(k-2)$, and $X(k-3)$, which have been applied to the terminal 6 at respective sampling times $T(k-1)$, $T(k-2)$, and $T(k-3)$ preceding the present sampling time Tk. The write address generator 20 is composed of counters 201 and 202. "1" is set in the counter 202 as the initial value corresponding to the channel 1 by the sampling pulse signal CK2. The counting-up operation of the counter 202 is performed in response to the sampling pulse signal 24CK2 which has a frequency 24 times that of the sampling pulse signal CK2, while the counter 201 counts up in synchronism with the sampling pulse signal CK2. The counter 202 generates an upper address for designating a channel number, whereas the counter 201 generates a lower address for designating one of the sample code words stored in the memory area corresponding to the channel 1. The read address generator 21 is made up of counters 211 and 213, and a register 212. "1" is set in the counter 213 as the initial value corresponding to the channel 1 by the sampling pulse signal CK1. The counting-up operation of the counter 213 is performed in response to the sampling pulse signal 24CK1 which has a frequency 24 times that of the sampling pulse signal CK1, while the counter 211 counts up in response to the timing pulse signal CK4'. The register 212 stores the output of the counter 211 in synchronism with the sampling pulse signal CK1. The counter 213 generates an upper address for designating a channel number, whereas the counter 211 generates a lower address for designating one of the sample code words stored in the memory area corresponding to the channel number designated by the counter 213.

Further, the structure in the 24-channel arrangement corresponding to the shift register 123 of the channel arrangement shown in FIG. 6 is an RAM 22 and an address generator 23 for the RAM 22. The RAM 22 has 24 storage areas, one of the channels, of which corresponds to each in which are stored four sample code words required for obtaining one interpolation value for each channel.

The address generator 23 is composed of counters 221 and 222, an adder 225, and a register 223. The counter 221 counts up in response to the clock signal 24CK1, while the counter 222 counts up in response to the output of an AND gate 224. The adder 225 adds "1" to the output of the counter 222. The register 223 stores the output of the adder 225 in synchronism with the sampling pulse signal CK1. The counter 221 generates an upper address for designating a channel number, whereas the counter 222 generates a lower address for designating one of the sample code words stored in the memory area corresponding to the designated channel number. The timing pulse signals CK3' and CK4' respectively correspond to the timing pulse signals CK3 and CK4 shown in FIG. 6.

Because the digital filter 15, the coefficient circuit 14, and the address generator 13 (all for the single-channel use) illustrated in FIG. 6 can as well be used in the 24-channel arrangement, no further description will be made thereof.

FIGS. 12A to 12L are diagrams used for describing the operation of the sample interpolator shown in FIG. 11. This operation will be described in detail hereunder referring to FIGS. 6 and 10 assuming the state where the temporal relationship between the sampling times Tj (FIG. 12A) and Tk (FIG. 12B) is the same as that in FIG. 9.

Figure 12:
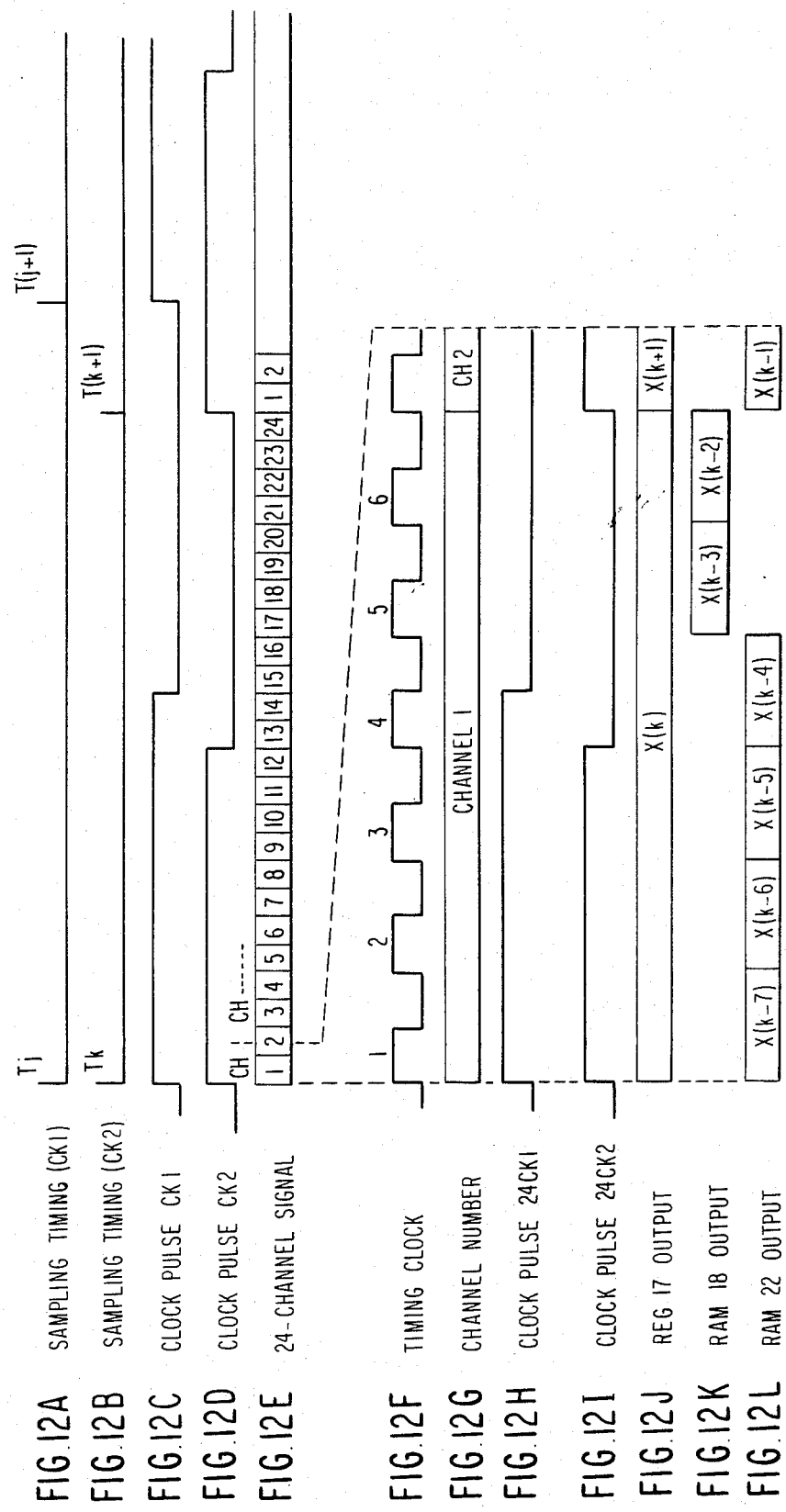
FIGS. 12A to 12L are waveform diagrams describing the operation of the circuit shown in FIG. 11.

A 24-channel time division multiplexed digital signal (FIG. 12E) is supplied to the terminal 6 in periods equal to one twenty-fourth of one sampling period. At time clock pulse 1 (FIG. 12F), the sample code word X(k) on the channel 1 (FIGS. 12E, 12G) fed to the terminal 4 is stored in the register 17 in synchronism with the then-present pulse sampling pulse 24CK2 signal (FIG. 12I). At this time, since the write address generator 20 gives applies an address designating the channel 1 to the RAM 18 via the selector 19, the output X(k) (FIG. 12J) of the register 17 is stored in the memory area corresponding to the channel 1 of the RAM 18. Further, at the timing clock pulse 1 (FIG. 12F), the counters 221 and 222 apply to the RAM 35 an address "1" for designating the channel 1 and an address "0" for designating the 0-th sample on the channel 1, respectively, in response to which the RAM 22 applies the sample code word X(k−7) (FIG. 12L) to the multiplier 151 (FIG. 6). Meanwhile, the coefficient circuit 14 (FIG. 6), in response to the address from the address generator 13 (FIG. 6), supplies the multiplier 151 with a coefficient $h_3^3$ corresponding to the 0-th sample code word on the channel 1. The sample code word X(k−7) multiplied by the coefficient $h_3^3$ by the multiplier 151 is applied to the accumulator 152.

Figure 13:
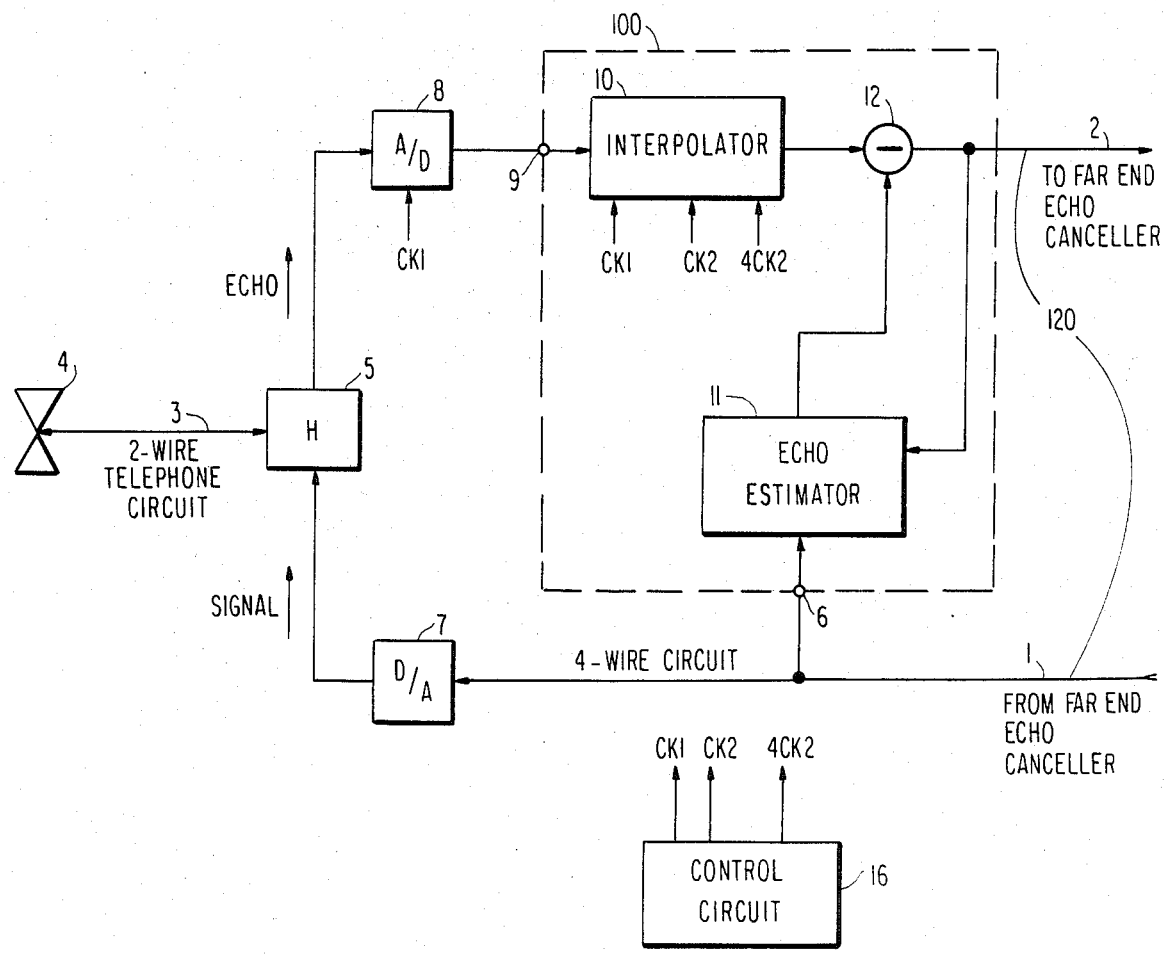
FIG. 13 is a block diagram of a third preferred embodiment of an echo canceller of the invention, in which the interpolator is connected to the output of the A/D converter.

At timing clock pulses 2 to 4, the sample code words X(k−6), X(k−5), and X(k−4) stored in the memory area corresponding to the channel 1 in the RAM 22 are read and supplied to the multiplier 151. Each of the sample code words X(k−6), X(k−5), and X(k−4), multiplied by the corresponding coefficients $h_2^3$, $h_1^3$, and $h_0^3$, is fed to the accumulator 152. The sample value to be interpolated on the channel 1 is determined in this manner. Next, at timing clock pulses 5 and 6, the oldest sample code words X(k−7) and X(k−6) on the channel 1 are replaced with the next sample code words X(k−3) and X(k−2) (FIG. 12K) so as to obtain a value to be interpolated at the next sampling time for the channel 1. The same procedure is applied to the channels 2 to 24. Although the sample interpolators 10 and 20 are connected to the terminal 6 in the foregoing embodiments, they may be connected to the terminal 9 as illustrated in FIG. 13.

Many alternatives and modifications to the above-described embodiments can be easily made within the scope of the invention defined by the appended claims.

What is claimed is:

1. An echo canceller for use in a long-distance telephone network having a four-wire circuit and a two-wire circuit, and which is responsive to an incoming digital signal supplied from a reception-side path of said four-wire circuit and to an outgoing digital signal including a digital echo signal and a two-wire digital signal, said digital echo signal being inherently produced at the junction of the four-wire circuit and the two-wire circuit, said incoming and outgoing digital signals having different sampling rates, wherein said echo canceller comprises:

a sample interpolator responsive to at least first and second samples of said incoming digital signal for converting said incoming digital signal into a digital signal having the same sampling rate as that of the outgoing digital signal and assuming a value based on the relative positions of the sampling times of the incoming and outgoing digital signals;

an echo estimator responsive to an output of said sample interpolator for producing an estimated echo signal to cancel said echo signal; and means for subtracting the estimated echo signal from the outgoing digital signal to produce an echo-cancelled digital signal, said echo estimator also being responsive to an output of said subtracting means.

2. An echo canceller for use in a long-distance telephone network having a four-wire circuit and a two-wire circuit, and which is responsive to an incoming digital signal supplied from the reception-side path of said four-wire circuit and to an outgoing digital signal including a digital echo signal and a two-wire digital signal, said digital echo signal being inherently produced at the junction of the four-wire circuit and the two-wire circuit, said incoming and outgoing digital signals having different sampling rates, wherein said echo canceller comprises:

a sample interpolator responsive to at least first and second samples of said outgoing digital signal for converting said outgoing digital signals into a digital signal having the same sampling rate as that of the incoming digital signal and assuming a value based on the relative positions of the sampling times of the incoming and outgoing digital signals;

an echo estimator responsive to an incoming digital signal for producing an estimated echo signal to cancel said echo signal; and means for subtracting the estimated echo signal from an output of said interpolator to produce an echo-cancelled digital signal, said echo estimator also being responsive to an output of said subtracting means.

3. An echo canceller for use in a long-distance telephone network having a four-wire circuit and a two-wire circuit, and which is responsive to an incoming digital signal supplied from a reception-side path of said four-wire circuit and to an outgoing digital signal including a digital echo signal and a two-wire digital signal, said digital echo signal being inherently produced at the junction of the four-wire circuit and the two-wire circuit, said incoming and outgoing digital signals having different sampling rates, wherein said echo canceller comprises:

a sample interpolator for converting said incoming digital signal into a digital signal having the same sampling rate as that of the outgoing digital signal, said sample interpolator comprising (1) a digital filter having a plurality of delay means connected in series with one another with a first of said delay means in said series connection of delay means receiving at an input thereof digital code words from a distant station, a plurality of multiplier means with one of said multiplier means having a first input coupled to said input of said first delay means and the other said multiplier means having a first input coupled to an output of a corresponding one of said delay means, each of said multiplier means having a second input; and summing means for summing outputs of each of said multiplying means; (2) a read only memory for storing a predetermined set of coefficients for application to said second inputs of said plurality of multiplier means; and (3) an address generator, said address generator comprising a counter and a register coupled to receive a count output from said counter, an output from said register being coupled to address inputs of said read only memory;

an echo estimator responsive to the output of said summing means of said sample interpolator for producing an estimated echo signal to cancel said echo signal; and means for subtracting the estimated echo signal from the outgoing digital signal to produce an echo cancelled digital signal, said echo estimator also being responsive to an output of said subtracting means.

4. The echo canceller of claim 3, wherein said register is clocked with a timing signal synchronous with said outgoing digital signal, said counter is cleared with a timing signal synchronous with said incoming signal, and said counter is clocked with a signal having a frequency which is an integer multiple of the frequency of said timing signal synchronous with said incoming digital signal.

5. An echo canceller for use in a long-distance telephone network having a four-wire circuit and a two-wire circuit, and which is responsive to an incoming digital signal supplied from a reception-side path of said four-wire circuit and to an outgoing digital signal including a digital echo signal and a two-wire digital signal, said digital echo signal being inherently produced at the junction of the four-wire circuit and the two-wire circuit, said incoming and outgoing digital signals having different sampling rates, wherein said echo canceller comprises:

a sample interpolator for converting said incoming digital signal into a digital signal having the same sampling rate as that of the outgoing digital signal, said sample interpolator comprising (1) means for supplying code words received from a distant station in a predetermined sequence, said code word supplying means including a first register receiving code words from said distant station, selector means having a first input coupled to an output of said first register, and a shift register having an input coupled to an output of said selector means and an output coupled to a second input of said selector means; (2) a read only memory for storing predetermined coefficients; (3) an address generator for addressing said read only memory, said address generator comprising a first counter for supplying a lower address to said read only memory; a second counter; and a second register coupled between an output of said second counter and said read only memory for supplying the upper address to said read only memory; and (4) a digital filter having a multiplier receiving a first input from said output of said shift register and a second input from an output of said read only memory; and an accumulator having an input coupled to an output of said multiplier;

an echo estimator responsive to an output of said accumulator of said sample interpolator for producing an estimated echo signal to cancel said echo signal; and means for subtracting the estimated echo signal from the outgoing digital signal to produce an echo cancelled digital signal, said echo estimator also being responsive to an output of said subtracting means.

6. The echo canceller of claim 5, wherein said first counter has a preset input receiving a timing signal synchronous with said outgoing digital signal and said first counter is clocked with a timing signal having bursts synchronous with a timing signal which is synchronous with said outgoing digital signal and having a frequency within said bursts which is an integer multiple of the frequency of said timing signal which is synchronous with said outgoing digital signal; wherein said second counter is cleared with a timing signal synchronous with said incoming digital signal and is clocked with a timing signal having a frequency which is an integer multiple of the frequency of said timing signal synchronous with said incoming digital signal; wherein said second register is clocked with said signal synchronous with said outgoing digital signal; wherein said first register is clocked with said timing signal synchronous with said incoming digital signal; and wherein a control input of said selector means receives a fifth timing signal which is in a state causing said selector means to connect said output of said first register to said input of said shift register from a time extending from a time following the commencement of an active state of said second timing pulse signal until a time following an active state of said first timing pulse signal and otherwise in a state causing connection of said output of said shift register to said input of said shift register.

7. An echo canceller for use in a long-distance telephone network having a four-wire circuit and a plurality of two-wire circuits, a predetermined number of communication signals, equal in number to the number of said two-wire circuits, being time-multiplexed on said four-wire circuit, said echo canceller being responsive to an incoming digital signal supplied from a reception-side path of said four-wire circuit and to outgoing digital signals including digital echo signals and a two-wire digital signal, said digital echo signals being inherently produced at junctions of said four-wire circuit and said two-wire circuits, said incoming and outgoing digital signals having different sampling rates, wherein said echo canceller comprises:

a signal interpolator for converting said incoming digital signals into digital signals having the same sampling rate as that of the outgoing digital signal, said interpolator comprising (A) (1) a first register receiving said incoming digital signal, said first register being clocked with a first timing pulse signal having a frequency a predetermined integer multiple of the repetition frequency of each component of said multiplexed incoming digital signal, said integer multiple being equal to the number of multiplexed components within said multiplexed incoming digital signal, (2) a first random access memory having a data input coupled to an output of said first register, (3) a second random access memory having a data input coupled to a data output of said first random access memory, (4) selector means having a data output coupled to address inputs of said first random access memory, (5) a write address generator having an output coupled to a first data input of said selector means, (6) a read address generator having outputs coupled to a second data input of said selector means, (7) a third address generator for supplying addresses to address inputs of said second random access memory; (B) a read only memory for storing predetermined coefficients; (C) a fourth address generator for addressing said read only memory;

and (D) a digital filter comprising (1) a multiplier having a first input coupled to an output of said second random access memory and a second input coupled to an output of said read only memory, and (2) an accumulator having an input coupled to an output of said multiplier;

a first demultiplexer receiving said outgoing digital signal for demultiplexing said outgoing digital signal into separated components;

a plurality of subtracting means, one of said subtracting means being provided for each output of said first demultiplexer, each of said subtractor means having a first input coupled to a corresponding output of said first demultiplexer;

a multiplexer having inputs receiving outputs from said subtractors, said multiplexer having a number of inputs equal to said number of said outputs of said first demultiplexer, and said multiplexer being operated synchronously with said first demultiplexer;

a plurality of echo estimators, the number of said echo estimators being equal to said number of outputs of said first demultiplexer, each of said echo estimators having an output coupled to a second input of a corresponding one of said subtracting means and an input coupled to an output of a corresponding one of said subtracting means; and a second demultiplexer having an input coupled to an output of said accumulator and a plurality of outputs, each of said outputs of said second demultiplexer being coupled to a second input of a corresponding one of said echo estimators.

8. The echo canceller of claim 7, wherein said write address generator comprises first and second counters, said first counter being clocked with a second timing pulse signal having a frequency the same as one of said components of said incoming digital signal and being synchronous therewith, and said second counter having a preset input receiving said second timing pulse signal, a data input coupled to receive a logic "1", and a clock input coupled to receive said first timing pulse signal having a frequency a predetermined integer multiple of said frequency of said component of said incoming digital signal, an output of said first counter being coupled through said selector means to a lower address input of said first random access memory and an output of said seond counter being coupled through said selector means to an upper address input of said random access memory; wherein said read address generator comprises a third counter clocked with a third timing pulse signal having pulses occurring a predetermined time after a predetermined edge of said second timing pulse signal connected to said clock input of said first counter, a second counter having a clock input coupled to receive a fourth timing pulse signal having a frequency a predetermined integer multiple of the frequency of said outgoing digital signal, a data input receiving a logic "1", and a preset input receiving a fifth timing pulse signal having a frequency equal to the frequency of said component of said outgoing digital signal and synchronous therewith, and a second register having an output coupled to a data input of said third counter, a clock input coupled to said preset input of said fourth counter and a data input coupled to an output of said third counter, said data output of said third counter being coupled through said selector means to lower address inputs of said random access memory and an output of said fourth counter being coupled through said selector means to said upper address inputs of said random access memory; wherein said third address generator comprises a fifth counter having a clock input receiving said fourth timing pulse signal having a frequency a predetermined integer multiple of the frequency of said outgoing digital signal, a sixth counter having a preset input coupled to said clock input of said fifth counter, a third register having a clock input receiving said fifth timing pulse signal, and AND gate having a first input coupled to receive said third timing pulse signal and to a write enable input of said second random access memory and a second input coupled to receive a sixth timing pulse signal having bursts synchronous with said fifth timing pulse signal and having a frequency within said bursts a predetermined second integer multiple of the frequency of said fifth timing pulse signal, and an adder receiving on a first input a logic "1" and on a second input an output from said sixth counter and having an output coupled to a data input of said third register, an output of said fifth counter being coupled to an upper address input of said second random access memory, and an output of said sixth counter being coupled to lower address inputs of said second random access memory; and wherein said fourth address generator comprises a seventh counter having a preset input coupled to receive said fifth timing pulse signal and a count input coupled to receive said sixth timing pulse signal, an eighth counter having a clear input coupled to receive said second timing pulse signal and a clock input coupled to receive a seventh timing pulse signal having a frequency a predetermined third integer multiple of said frequency of said component of said incoming digital signal, and a fourth register having a data input coupled to an output of said eighth counter and a clock input coupled to receive said fifth timing pulse signal, an output of said fourth register being coupled to an upper address input of said read only memory and an output of said seventh counter being coupled to a lower address input of said read only memory.

9. A method for cancelling echoes in a long-distance telephone network having a four-wire circuit and a two-wire circuit, said cancellation of the echoes being performed by using an incoming digital signal supplied from a reception-side path of said four-wire circuit and an outgoing digital signal including a digital echo signal and a two-wire digital signal, said digital echo signal being inherently produced at the junction of the four-wire circuit and the two-wire circuit, said incoming and outgoing digital signals having different sampling rates, said method comprising the steps of:

converting said incoming digital signal, in response to at least first and second samples of said incoming digital signal, into a digital signal having the same sampling rate as that of the outgoing digital signal and assuming a value based on the relative positions of the sampling times of the incoming and outgoing digital signals;

producing an estimated echo signal to cancel said echo signal in response to the converted incoming digital signal and an echo-cancelled digital signal; and subtracting the estimated echo signal from the outgoing digital signal to produce an echo-cancelled digital signal.

10. A method for cancelling echoes in a long-distance telephone network having a four-wire circuit and a two-wire circuit, the cancellation of the echoes being performed by using an incoming digital signal supplied from the reception-side path of said four-wire circuit and an outgoing digital signal including a digital echo signal and a two-wire digital signal, said digital echo signal being inherently produced at the junction of the four-wire circuit and the two-wire circuit, said incoming and outgoing digital signals having different sampling rates, said method comprising the steps of:

converting said outgoing digital signal, in response to at least first and second samples of said outgoing digital signal, into a digital signal having the same sampling rate as that of the incoming digital signal and assuming a value based on the relative positions of the sampling times of the incoming and outgoing digital signals;

producing an estimated echo signal to cancel said echo signal in response to an incoming digital signal and an echo-cancelled digital signal; and subtracting the estimated echo signal from the converted outgoing digital signal to produce an echo-cancelled digital signal.

11. An echo canceller for use in a long-distance telephone network having a four-wire circuit and a two-wire circuit, and which is responsive to an incoming digital signal supplied from a reception-side path of said four-wire circuit and to an outgoing digital signal including a digital echo signal and a two-wire digital signal, said digital echo signal being inherently produced at the junction of the four-wire circuit and the two-wire circuit, said incoming and outgoing digital signals having different sampling rates, wherein said echo canceller comprises:

a sample interpolator for converting said incoming digital signal into a digital signal having the same sampling rate as that of the outgoing digital signal, said sample interpolator comprising (1) a signal filter having a plurality of delay means connected in series with one another with a first of said delay means in said series connection of delay means receiving at an input thereof digital code words from a distant station, a plurality of multiplier means with one of said multiplier means having a first input coupled to said input of said first delay means and the other said multiplier means having a first input coupled to an output of a corresponding one of said delay means; and summing means for summing outputs of each of said multiplying means; (2) a read only memory for storing a predetermined set of coefficients; and (3) an address generator, said address generator comprising a counter and a register coupled to receive a count output from said counter, an output from said register being coupled to address inputs of said read only memory;

an echo estimator responsive to the output of said sample interpolator for producing an estimated echo signal to cancel said echo signal, an output of said summing means being coupled to an input of said echo estimator; and means for subtracting the estimated echo signal from the outgoing digital signal to produce an echo cancelled digital signal, said echo estimator also being responsive to an output of said subtracting means;

wherein said register is clocked with a timing signal synchronous with said outgoing digital signal, said counter is cleared with a timing signal synchronous with said incoming signal, and said counter is clocked with a signal having a frequency which is an integer multiple of the frequency of said timing signal synchronous with said incoming digital signal.

12. The echo canceller of claim 11, wherein said output of said register is coupled as an upper address to said read only memory and a repetitive sequence of binary numbers is supplied as a lower address to said read only memory.

13. An echo canceller for use in a long-distance telephone network having a four-wire circuit and a two-wire circuit, and which is responseive to an incoming digital signal supplied from a reception-side path of said four-wire circuit and to an outgoing digital signal including a digital echo signal and a two-wire digital signal, said digital echo signal being inherently produced at the junction of the four-wire circuit and the two-wire circuit, said incoming and outgoing digital signals having different sampling rates, wherein said echo canceller comprises:

a sample interpolator for converting said incoming digital signal into a digital signal having the same sampling rate as that of the outgoing digital signal, said sample interpolator comprising (1) means for suppling code words received from a distant station in a predetermined sequence, said code word supplying means including a first register receiving code words from said distant station, selector means having a first input coupled to an output of said first register, and a shift register having an input coupled to a second input of said selector means; (2) a read only memory for storing predetermined coefficients; (3) an address generator for addressing said read only memory, said address generator comprising a first counter for supplying a lower address to said read only memory, a second counter; and a second register coupled between an output of said second counter and upper address bits of said read only memory; and (4) a digital filter having a multiplier receiving a first input from said output of said shift register and a second input from an output of said read only memory; and an accumulator having an input coupled to an output of said multiplier;

an echo estimator responsive to an output of said sample interpolator for producing an estimated echo signal to cancel said echo signal, an output of said accumulator being coupled to an input of said echo estimator; and means for subtracting the estimated echo signal from the outgoing digital signal to produce an echo cancelled digital signal, said echo estimator also being responsive to an output of said subtracting means, wherein said first counter has a present input receiving a timing signal synchronous with said outgoing digital signal and said first counter is clocked with a timing signal having bursts synchronous with a timing signal which is synchronous with said outgoing digital signal and having a frequency within said bursts which is an integer multiple of the frequency of said timing signal which is synchronous with said outgoing digital signal; wherein said second counter is cleared with a timing signal synchronous with said incoming digital signal and is clocked with a timing signal having a frequency which is an integer multiple of the frequency of said timing signal synchronous with said incoming digital signal; wherein said second register is clocked with said signal synchronous with said outgoing digital signal; wherein said first register is clocked with said timing signal synchronous with said incoming digital signal; and wherein a control input of said selector means receives a fifth timing signal which is in a state causing said selector means to connect said output of said first register to said input of said shift register from a time extending from a time following the commencement of an active state of said second timing pulse signal until a time following an active state of said first timing pulse signal and otherwise in a state causing connection of said output of said shift register to said input of said shift register.

14. The echo canceller of claim 13, wherein said shift register is clocked with said third timing signal and with a fourth timing signal synchronous with said second timing signal and having pulses commencing following an active state of said second timing signal.

15. The echo canceller of claim 14, wherein said interpolator further comprises (5) means for generating said third and fourth timing pulse signals comprising a second shift register receiving a data "1" at a data input thereof, said first timing pulse signal at a clear input thereof, and a clock signal at a clock input thereof; a OR gate having a first input coupled to receive an output from said second shift register and a second input coupled to receive said clock signal, said third timing pulse signal being produced on an output of said OR gate; a D-type flip-flop having a D input coupled to receive a data "1" and a clock input coupled to receive said second timing pulse signal; an AND gate having a first input coupled to said output of said second shift register and a second input coupled to an output of said flip-flop; and a multivibrator having a trigger input coupled to an output of said AND gate and an output coupled to a clear input of said flip-flop, said fourth timing pulse signal being produced at said output of said multivibrator.

* * * * *

UNITED STATES PATENT AND TRADEMARK OFFICE
CERTIFICATE OF CORRECTION

PATENT NO.   : 4,527,020
DATED        : July 2, 1985
INVENTOR(S)  : Yoshinori Ito It is certified that error appears in the above-identified patent and that said Letters Patent is hereby corrected as shown below:

Abstract, next to last line, "substracted" should be --subtracted--.

Column 1, line 26, before "used" insert --is--;

line 48, before "four-wire" insert --the--;

line 56, after "includes" delete ":".

Column 2, line 21, delete "of waveforms".

Column 3, line 53, "codewords" should be --code words--.

Column 4, line 13, "operater" should be --operates--;

line 13, after "manner", ";" should be --:--;

line 29, "codeword" should be -- code word --;

line 31, "codeword" should be -- code word --;

line 53, "and "10" "11"" should be --"10" and "11"--;

line 65, before "the" delete "of";

UNITED STATES PATENT AND TRADEMARK OFFICE
CERTIFICATE OF CORRECTION

PATENT NO. : 4,527,020
DATED : July 2, 1985
INVENTOR(S) : Yoshinori Ito

It is certified that error appears in the above-identified patent and that said Letters Patent is hereby corrected as shown below:

Column 4, line 66, "address" should be --addresses--;

Column 5, line 34, after "with" delete "of";

line 45, after "A" insert --and--;

lines 45 and 46, delete "the output of";

line 46, after "the", first occurrence insert -- output of --;

Column 6, line 31, "codeword" should be --code word--;

line 42, "out-puts" should be --outputs--;

line 47, after "At" delete "the pulse of";

line 47, after "of" insert --the pulse of--;

line 56, "codeword" should be --code word--.

Column 7, line 29, after "of" insert --the--;

line 30, before "24-channel" delete "the";

line 36, before "24" insert --rate--;

UNITED STATES PATENT AND TRADEMARK OFFICE
CERTIFICATE OF CORRECTION

PATENT NO. : 4,527,020

DATED : July 2, 1985

INVENTOR(S) : Yoshinori Ito

It is certified that error appears in the above-identified patent and that said Letters Patent is hereby corrected as shown below:

Column 7, line 40, after "separates" insert --the--;

line 41, before "incoming" delete "the";

line 67, delete "each of";

line 67, after "26" insert --the corresponding--;

Column 8, line 7, after "arrangement" insert --show in Fig. 6 includes a register--;

line 47, before "arrangement" insert --single--;

line 50, after "areas," delete "one of the channels,";

line 50, before "of" insert --each--;

line 51, delete "each" and insert --one of the channels,--.

Column 9, line 15, "time" should be --timing--;

line 20, after "20" delete "gives".

UNITED STATES PATENT AND TRADEMARK OFFICE
CERTIFICATE OF CORRECTION

PATENT NO. : 4,527,020

DATED : July 2, 1985

INVENTOR(S) : Yoshinori Ito

It is certified that error appears in the above-identified patent and that said Letters Patent is hereby corrected as shown below:

Column 13, line 47, "seond" should be --second--;

line 42, "telphone" should be --telephone--.

Signed and Sealed this

Twenty-first Day of January 1986

[SEAL]

Attest:

DONALD J. QUIGG

Attesting Officer

Commissioner of Patents and Trademarks